Mar. 3, 1925.
G. E. LAMPE
1,528,114
POWER TAKE-OFF ATTACHMENT FOR FORDSON TRACTORS
Filed March 26, 1924
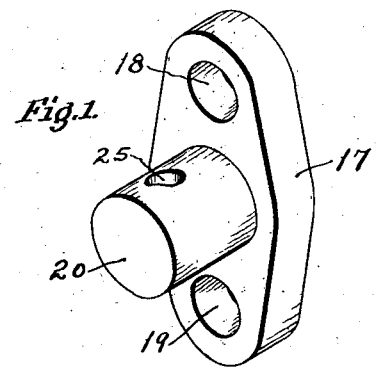
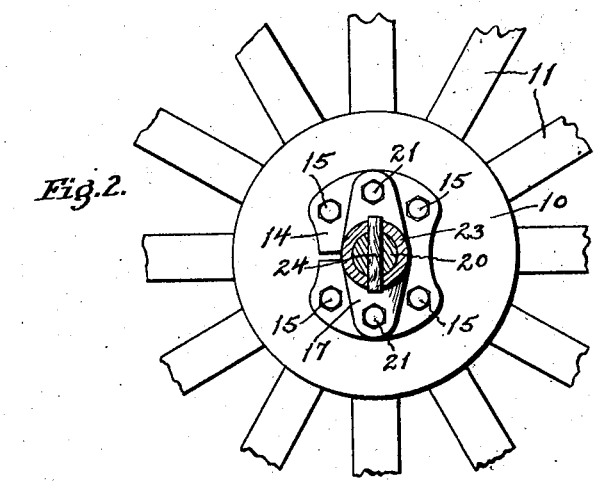
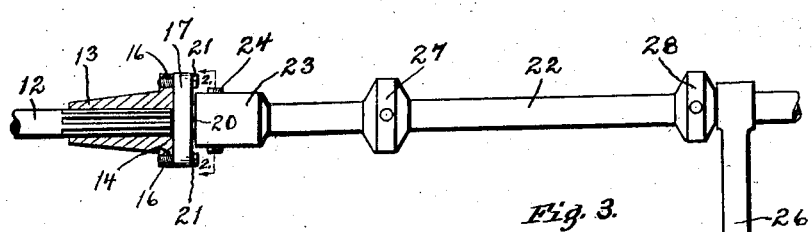
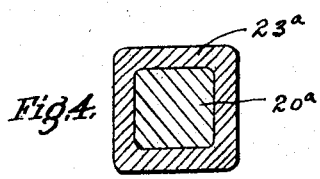
INVENTOR
G. E. LAMPE
BY Earl M. Sinclair
ATTORNEY Patented Mar. 3, 1925.

UNITED STATES PATENT OFFICE.

1,528,114

GEORGE E. LAMPE, OF POCAHONTAS, IOWA.

POWER-TAKE-OFF ATTACHMENT FOR FORDSON TRACTORS.

Application filed March 26, 1924. Serial No. 702,020.

*To all whom it may concern:*

Be it known that I, GEORGE E. LAMPE, a citizen of the United States of America, and resident of Pocahontas, Pocahontas County, Iowa, have invented a new and useful Power-Take-Off Attachment for Fordson Tractors, of which the following is a specification.

The object of this invention is to provide an improved attachment for a Fordson tractor to facilitate the transmission of power from the power plant of said tractor for the operation of an auxiliary device or machine.

A further object of this invention is to provide a power take-off attachment adapted to be easily and quickly attached to the rear wheel of a tractor and to transmit power from the power plant of the tractor, at any of the speeds which the tractor itself may possess, for the operation of an auxiliary device or machine.

My invention consists in the construction, arrangement and combination of elements hereinafter set forth, pointed out in the claims and illustrated by the accompanying drawing, in which—

Figure 1 is a perspective view of the attachment embodying my invention.

Figure 2 is an elevation showing the attachment in position for use, partly in section on the line 2—2 of Figure 3.

Figure 3 is an elevation at right angles to Figure 2, on a reduced scale.

Figure 4 is a cross-section of a modified form.

This attachment is especially designed for use in connection with the Fordson tractor by attachment to one of the rear wheels or traction wheels thereof, it being used by jacking up or otherwise elevating the rear axle of the tractor so that such traction wheel is raised clear of the ground or floor. In Figure 2 a portion of one of the rear or traction wheels is shown, including a hub 10 and spokes 11, the remaining portions being omitted, the driving axle 12 also being shown in section. In the construction of this make of tractor a flanged bushing 13 is provided, the bushing being mounted in the bore of the hub 10 with the flange 14 thereof contacting the outer face of said hub, the rear or driving axle 12, which is connected with the power plant through a transmission and differential mechanism (not shown), in such manner that the axle may be driven at different speeds, extending through said bushing and having its end terminating flush with the outer face of said flange 14. The flanged bushing is held in place relative to the wheel by means of four cap screws 15 extending through the flange 14 and seated in the hub 10. The flange 14 is also provided by the manufacturer with two additional holes 16, aside from those receiving the attaching cap screws 15, which holes 16 are of the same dimension as the other holes but are tapped or threaded. After the cap screws 15 are removed, two of them are designed to be inserted in the tapped holes 16 and pressure applied against the face of the hub 10 by turning said screws with a wrench, to force the flanged bushing out of its seat in the hub. The holes for the cap screws 15 are arranged in pairs on lines diametrically of the bushing and axle, and the tapped holes 16 are arranged in a similar manner and equally spaced from the axis of the bushing.

The attachment comprises a head or bar 17 formed with spaced holes 18, 19 therein, said holes corresponding in diameter and spacing to the holes 16 of the flanged bushing and also the holes thereof which receive the cap screws 15. The head or bar 17 is formed with a stub shaft 20 projecting centrally from one face thereof. The head or bar 17 is adapted to be mounted against the outer face of the flange 14 of the bushing, extending across the end of the axle 12, with the stub shaft 20 projecting outwardly in alinement with said axle. The head or bar 17 preferably is so arranged that its holes 18, 19 register with the tapped holes 16 of the flanged bushing, and is held in place by means of cap screws 21 mounted through said holes 18, 19 and seated in the holes 16. However, if desired two of the cap screws 15 may be removed, and the head or bar 17 be arranged so that its holes 18, 19 register with the holes from which they have been removed, and held in place by longer cap screws extending through the holes 18, 19, through the holes in the flange and seated in the tapped holes in the hub 10.

When the attachment is mounted as described the stub shaft 20 may be connected with a tumbling rod or power shaft such as 22 (Figure 3) employed for the operation of a device or machine such as a mill, shredder, silo cutter, washing machine or the like. As shown, the shaft 22 is provided at one end with a socket 23 adapted to receive the stub shaft 20 and be secured operatively thereto by means, preferably, of a wooden break pin 24 extending through registering holes in said socket and a hole 25 in said stub shaft. The shaft 22 is shown as supported by a standard or bearing 26 and equipped with universal joints 27, 28, shown conventionally, and the socket 23 may also, if desired, constitute a part of a universal joint.

In use the rear axle is elevated so that the traction wheel to which the attachment is connected turns freely, the parts are connected as shown and described, and the power plant of the tractor is operated to turn the axle, wheel, head 17, stub shaft 20 and shaft 22, thus operating the device or machine to which said shaft 22 is connected.

The operating speed may be the same as any of the various speeds provided for operating the traction wheels of the tractor, since the driving attachment is connected directly with such wheels.

When not desired for use in this manner, the stub shaft may be disconnected by removing the pin 24 and socket 23, and the head 17 with its stub shaft may be allowed to remain on the tractor wheel, as it is not in the way, unless perchance when it is necessary to remove the wheel as previously described. It is thus obvious that the attachment is exceedingly simple and inexpensive, is easily attached, and requires little time or labor to connect it up in operative relation for the purposes indicated.

A square stub shaft 20ᵃ may be employed if desired, in place of the round shaft 20, as shown in Figure 4, fitting in a squared socket 23ᵃ of a universal joint or tumbling rod connection, and I do not wish to be understood as limiting myself to the precise construction and arrangement of parts, except within the scope of the appended claims.

I claim as my invention—

1. The combination with a tractor wheel having a hub, a flanged bushing mounted therein and an axle traversing said hub and bushing and terminating flush with the outer face of the latter, of a power take-off attachment comprising a member adapted to extend across and be fixed to the flange of said bushing, said member being formed with a stub shaft arranged in alinement with said axle and adapted to be connected to a follower shaft.

2. The combination with a tractor wheel having a hub, a flanged bushing mounted therein and an axle traversing said hub and bushing and terminating flush with the outer face of the latter, of a power take-off attachment comprising a member adapted to extend across the flange of said bushing and the end of the axle therein, said member being formed with apertures adapted to register with apertures in said flange, connecting devices adapted to extend through said apertures, said member being formed with a stub shaft projecting from its outer face in alinement with said axle and adapted to be connected to a follower shaft.

3. The combination with a tractor wheel having a hub, a flanged bushing mounted therein and an axle traversing said hub and bushing and terminating flush with the outer face of said flange, said flange being formed with a pair of apertures equally distant from and on opposite sides of the axis of said axle, of a power take-off attachment comprising a head or bar adapted to extend across said flange and formed with a pair of apertures adapted to register with the apertures thereof, means for connecting said head or bar to said flange through said registering apertures, said member being formed with a stub shaft projecting from its outer face in alinement with said axle and adapted to be detachably connected to a follower device.

Signed at Pocahontas, in the county of Pocahontas and State of Iowa, this 18th day of January, 1924.

GEORGE E. LAMPE